United States Patent
Nelson

[15] 3,658,087
[45] Apr. 25, 1972

[54] VALVE WITH INTEGRAL CLOSURE AND SEAT CARRIER UNIT

[72] Inventor: Norman A. Nelson, Houston, Tex.

[73] Assignee: ACF Industries, Incorporated, New York, N.Y.

[22] Filed: Feb. 8, 1971

[21] Appl. No.: 113,687

Related U.S. Application Data

[63] Continuation of Ser. No. 825,352, May 26, 1969, abandoned.

[52] U.S. Cl. ..................... 137/454.6, 251/175, 251/327
[51] Int. Cl. ........................................ F16k 3/20, F16k 51/00
[58] Field of Search .................. 137/454.2, 454.5, 454.6; 251/327, 175

[56] References Cited

UNITED STATES PATENTS

| | | | |
|---|---|---|---|
| 1,898,935 | 2/1933 | Brandriff | 137/454.2 X |
| 3,150,681 | 9/1964 | Hansen et al. | 137/454.2 |
| 3,194,259 | 7/1965 | Garrod | 137/454.2 |
| 3,244,399 | 4/1966 | Jones et al. | 251/327 |

Primary Examiner—Arnold Rosenthal
Attorney—James L. Jackson

[57] ABSTRACT

A gate valve structure comprising a valve body defining a valve chamber and having inlet and outlet passageways disposed in fluid communication with the valve chamber. Internal bosses surrounding the inlet and outlet passages, protrude into the valve chamber and are provided with substantially planar sealing surfaces. A bonnet, forming a closure for the valve body, includes a reciprocating stem means for opening and closing the valve and supports a seat carrier and gate guide member which depends into the valve chamber. A pair of seat members are supported by the carrier for sealing engagement with the sealing surfaces and are disposed in sealing engagement with a gate member which is movably disposed within the carrier and connected at the upper extremity thereof to the valve stem. Upon separation of the bonnet from the valve body, the gate, gate guide and seat members are simultaneously withdrawn from the valve body as a unit, thereby promoting simple and quick replacement of all of the moving parts of the valve.

11 Claims, 5 Drawing Figures

Norman A. Nelson
INVENTOR

BY James Jackson
ATTORNEY

Norman A. Nelson
INVENTOR

BY *James D. Jackson*
ATTORNEY

VALVE WITH INTEGRAL CLOSURE AND SEAT CARRIER UNIT

This is a continuation of application, Ser. No. 825,352, filed May 16, 1969, and now abandoned.

BACKGROUND OF THE INVENTION

This invention relates generally to gate valve structures and more particularly to gate valve structures employed in wellheads and the like having internal valve parts which are subject to repair or replacement. The invention is also particularly related to subsea wellhead structures including submerged valves which ordinarily can be serviced or repaired only through extremely expensive repair or replacement operations.

When subsea wellhead valves are located in submerged condition on the ocean floor and are in need of repair or replacement of the gate or seat assemblies thereof, it is generally necessary for a diver to gain access to the valve and to disassemble the valve structure after the wellhead has been made safe, either by closing a master valve or by killing the well through other convenient means. The diver then must remove the internal parts of the valve structure and must extract the seat assemblies and replace them with new seat assemblies. After repair or replacement of other valve parts, the diver then must reassemble the valve. Repair of valves under this condition is generally extremely difficult and may well be impossible. Frequently, a subsea valve may be located in water of sufficient depth that repair is impractical or extremely hazardous or expensive.

As an alternative, the well may be killed and the entire wellhead valve may be removed and brought to the surface where repair or replacement of valve parts can take place. When this is done, it is frequently convenient to replace the entire wellhead valve system and to repair the valves of removed wellhead valve system at a later date. This, however, is an extremely expensive operation and is usually done only where it is impossible to repair wellhead valves in place by diver assistance.

At least one subsea wellhead valve mechanism has been recently developed that includes a mechanism for automatically releasing the connection between the valve body and bonnet. After release of the bonnet connection has been accomplished, the bonnet, gate and gate guide structure are removed and only the seat rings are left within the valve body. It is frequently necessary to replace the seat members of the valve in order to prevent leakage of the valve once reassembled and therefore, a valve system is desired which will enable simultaneous removal of seat assemblies along with the bonnet, gate and gate guide structures.

The instant invention, therefore, has as its principle object the provision of a novel gate valve mechanism which is so constructed as to allow removal of the gate member, seats and other movable parts of the valve as a unit.

Another important object of this invention is to provide a novel gate valve structure including a bonnet which is readily manually or mechanically detachable from the valve body and which supports the gate seats and internal valve parts, thereby allowing repair or replacement simply by removing and replacing the bonnet structure.

It is a further object of this invention to provide a novel gate valve structure allowing the use of movable or "floating" seat members, which are capable of limited movement to insure fluid tight sealing ability of the valve.

An even further object of this invention contemplates the provision of a novel gate valve structure utilizing a seat carrier and gate guide housing structure disposed in fixed relation with the valve bonnet and being linearly and rotatably adjustable to insure proper positioning of the seat members and gate guide mechanism within the valve body.

It is another object of this invention to provide a novel gate valve structure which is simple in nature, reliable in use and low in cost.

Other and further objects, advantages and features of this invention will become apparent to one skilled in the art upon consideration of the specification, the attached claims and the annexed drawings. The form of the invention which will now be described in detail, illustrates the general principles of the invention, but it is to be understood that this detailed description is not to be taken as limiting, since the scope of the invention is thus defined by the appended claims. Such description will be referred to by reference characters in the drawings in which:

Briefly, the invention involves a valve body construction which is simply in the form of a hollow shell and includes opposed bosses surrounding inlet and outlet passageways formed in the valve body structure and defining substantially planar sealing surfaces. The internal movable parts of the valve construction include a gate member which reciprocates between open and closed positions to control the flow of fluid through the valve and opposed seat members disposed in sealing engagement with the planar sealing surfaces. The sealing surfaces are also disposed in sealing engagement with the working surface of the gate member. The gate member and seat members are supported within the valve body by a gate guide and seat carrier housing disposed in fixed relationship to the bonnet structure of the valve. Upon disassembly of the bonnet structure from the valve, the gate member and the movable seat members are withdrawn along with the gate guide and seat carrier housing, thereby removing all of the moving parts of the valve in a single operation. Likewise, replacement of all of the movable parts of the valve may be accomplished simply by assembly of the bonnet structure to the valve body along with the gate, seats and gate guide housing structure fixed thereto. These features effectively simplify the procedure for repairing the valve and promote valve repair by diver assistance or by remotely controlled mechanical valve repair apparatus.

Figure 1:
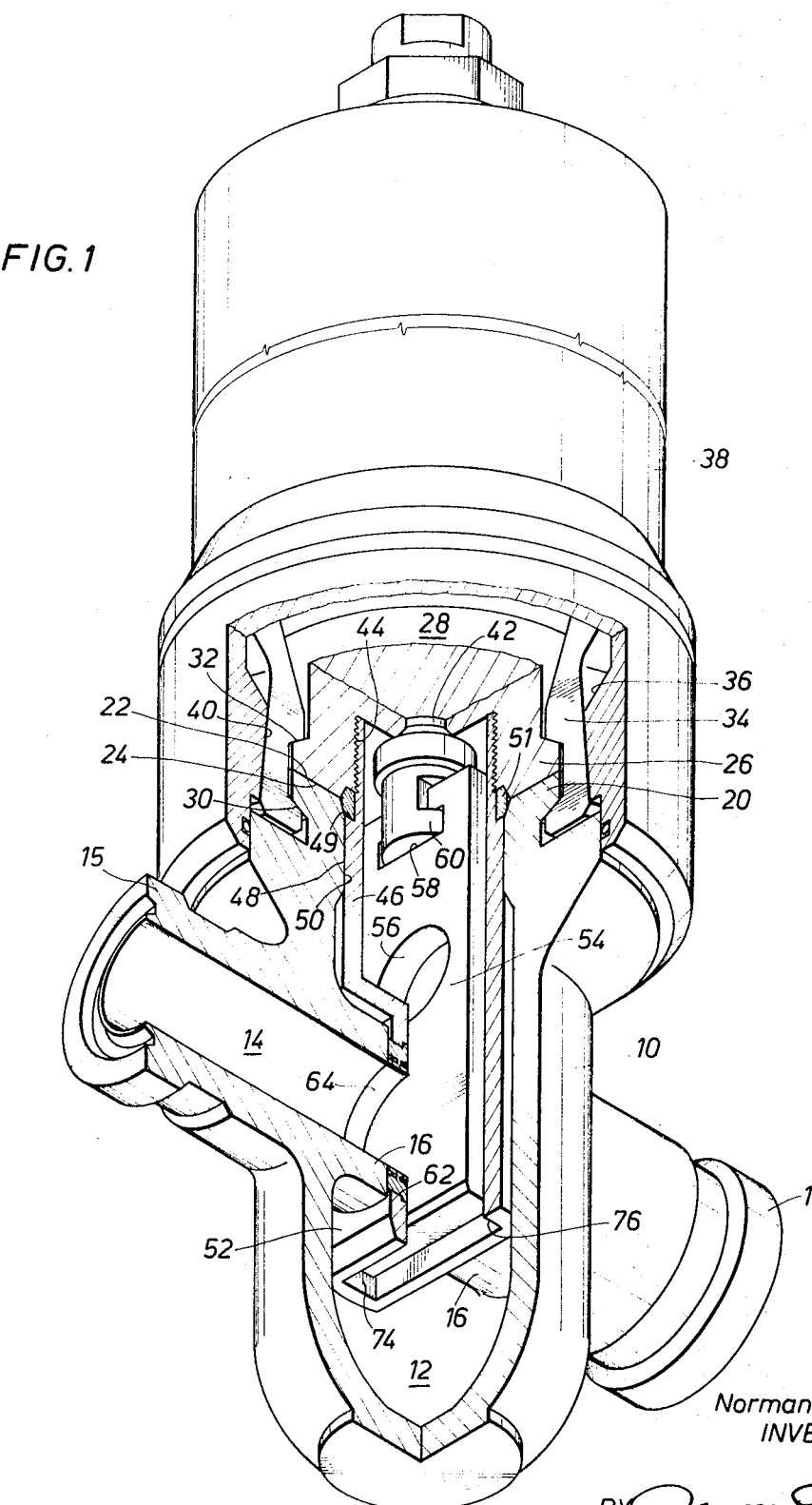
FIG. 1 is an isometric view of an assembled gate valve and valve operator mechanism having parts thereof broken away and illustrated in quarter section.
Figure 2:
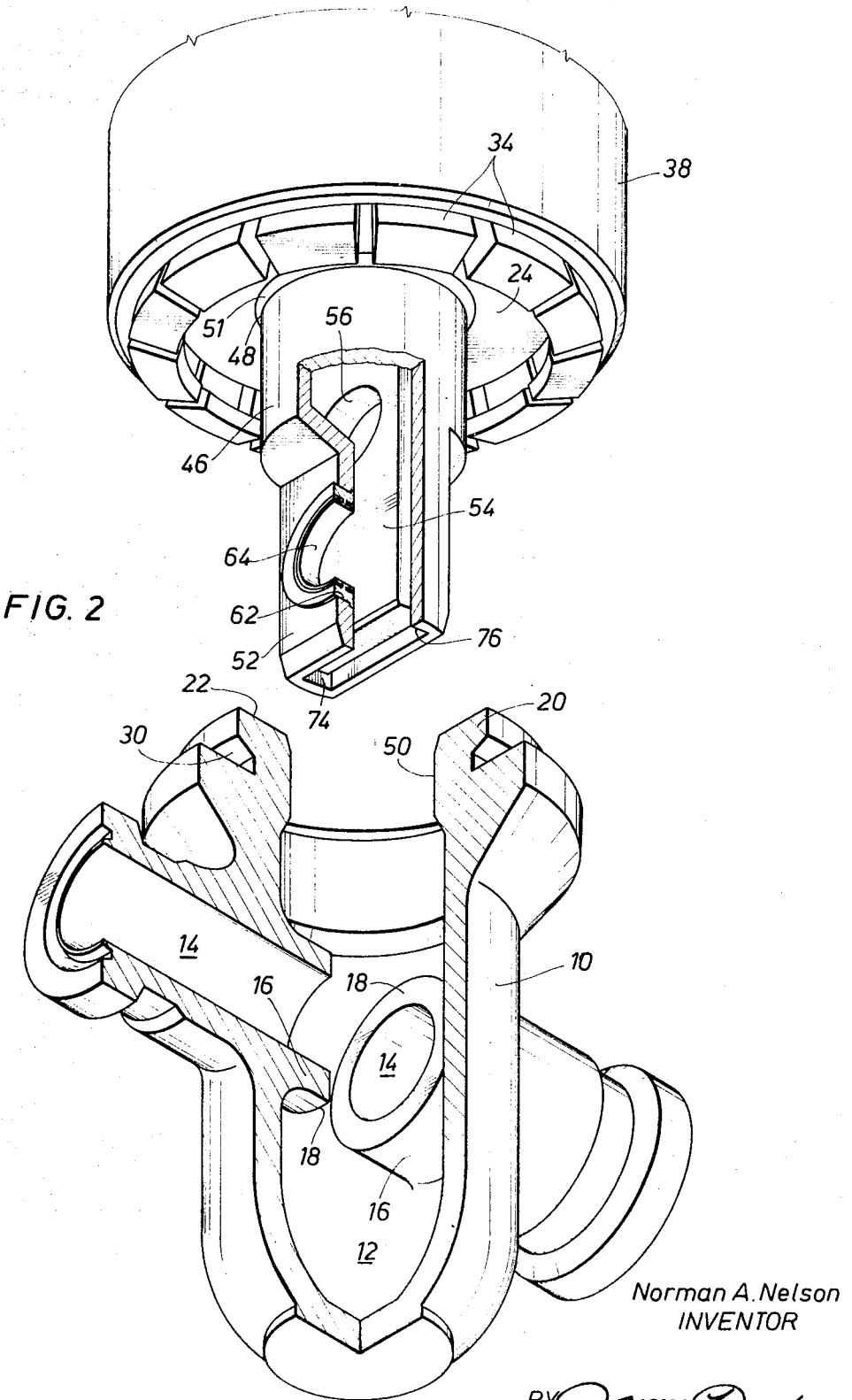
FIG. 2 is an isometric view of the valve and valve operator mechanism of FIG. 1 illustrated in the disassembled condition thereof.

With reference now to the drawings for a more detailed description of the invention, a valve body 10, illustrated in FIGS. 1 and 2 defines a valve chamber 12. Inlet and outlet passageways 14 are formed within the valve body in order to conduct the flow of fluid therethrough and terminate at connection flanges 15 of any desired configuration for securing the valve body in conventional manner to conduit structure. Internal bosses 16 are formed within the valve body about inlet and outlet passageways 14 and terminate in substantially planar sealing surfaces 18. A closure flange 20 is provided at the upper extremity of the valve body 10 and is provided with a sealing surface 22 adapted for sealing engagement with a similar annular sealing surface 24 formed on the annular flange 26 of a bonnet 28, forming a closure for the valve. The closure flange 20 and the bonnet flange 26 are provided with tapered or frusto-conical surfaces 30 and 32 respectively, which are engaged by a plurality of segment clamps 34, capable of maintaining the closure flange 20 and bonnet flange 26 in sealed assembly. The segment clamps 34 are engaged by a tapered internal cam surface 36 formed on a shroud member 38 for the purpose of pivoting the segment clamps from the clamped position illustrated in FIG. 1 to an unlatched position for release of the bonnet flange and closure flange connection. The shroud 38 is also provided with an internal annular tapered surface 40 for engaging the segment clamp members 34 in order to lock the segment clamps in compressive assembly with the bonnet flange and closure flange structure.

The bonnet 28 is formed integral with the base portion of a spring return type linear hydraulic valve operator which is capable, in response to the hydraulic control of imparting reciprocal movement to a valve stem 42 extending through the bonnet structure 28 and into the cylinder of the valve operator for connection to the piston member of the valve operator. For so much of the details of the valve operator mechanism and segment clamp structure as is necessary for a thorough understanding of this invention, reference may be had to U.S. Pat. application, of Norman A. Nelson, Ser. No. 697,706, filed Jan. 15, 1968. Control of the valve operator mechanism of this invention is achieved by transmitting hydraulic fluid through appropriate passageways formed in the valve body and valve operator mechanism essentially as disclosed in application, Ser. No. 697,706.

The bonnet 28 is provided with an internally threaded blind bore 44, which threadedly receives the upper externally threaded extremity 45 of a carrier housing member 46. The upper portion of the carrier housing is of substantially cylindrical configuration and, when inserted into the valve, establishes a close guiding fit with a substantially cylindrical guide surface 50 in order to positively align the carrier housing within the valve body. The lower portion 52, of the carrier housing 46, is of generally rectangular configuration and provides internal guiding surfaces for maintaining proper alignment of a valve element or gate member 54 movably disposed within the carrier housing 46. The upper, generally cylindrical portion 48 of the carrier housing 46 is of larger diameter than the externally threaded portion 45 of the carrier housing defining an annular shoulder 49. An annular seal ring 51 is provided to establish a seal at the joint between the closure flange 20 and bonnet flange 26. The annular shoulder 49 engages the seal member 51 upon removal of the carrier housing 46 from the valve body thereby extracting the seal member 51 and causing the seal member to be retained in assembly with the bonnet and carrier housing structure. The gate member 54 is provided with a port 56 which, in the open position of the valve, is disposed in registry with the inlet and outlet passages 14 in order to allow the flow of fluid therethrough. In the closed position of the gate member 54, an imperforate portion thereof is registered with the inlet and outlet passages 14 and effectively blocks the flow of fluid through the valve. The uppermost portion of the gate member 54 is provided with a slot 58 of substantially tee shaped configuration which receives a tee head 60 formed at the lowermost portion of the valve stem 42 to establish operative connection between the valve stem and gate member.

The lower portion 52 of the carrier housing 46 is provided with opposed openings 62 which receive annular seat members 64 establishing sealing engagement between the gate member 54 and the sealing surfaces 18 of the bosses 16. The seat members 64 are provided with external flanges 68 received within enlarged portions of the openings 62 to establish stop shoulders limiting movement of the seat members in a direction away from the gate member 54. Movement of the seat members in the opposite direction is limited by the gate member 54. The seat members are of the "floating" type which move in response to fluid pressure and seek proper sealing relation with the sealing surfaces 18. The seat members 64 are provided with annular sealing members 70 and 72 for establishing sealing engagement respectively with the sealing surfaces 18 and the working surface of the gate member 54.

Lateral or sidewise movement of the gate member relative to the inlet and outlet passageways 14 is controlled by guide surfaces 74 and 76 provided within the lowermost portion of the carrier housing 46.

As illustrated in FIG. 1, the valve and bonnet structure, when assembled, will place the carrier housing 46 in properly centered position within the valve chamber. The upper cylindrical portion 48 of the carrier housing 46 will cooperate with the cylindrical guide surface 50 causing the carrier housing to be accurately centered within the valve chamber. The valve seats 64 will be accurately located in sealing engagement with the sealing surfaces 18 of the bosses 16 and the downstream one of the seats will be allowed to shift or float slightly downstream relative to the carrier housing within limits controlled by the flange 68 in order to establish proper sealing engagement with the sealing surfaces. The upstream one of the valve seats 64 will not be capable of providing a sealing function because it will be shifted by fluid pressure away from the corresponding sealing surface. The upstream seat, however, will seal upon reversal of the flow of fluid.

In the event repair of the seat assemblies or other working parts of the valve becomes necessary, such repair can be accomplished simply be removing the bonnet 28 from the valve body and retrieving all working parts of the valve as a unit. It is merely necessary to move the shroud member 38 linearly with respect to the bonnet, thereby causing the cam surface 36 to contact the uppermost portion of the segment clamps and pivot the segment clamps, causing the same to release the closure flange 20 from the bonnet flange 26. When this has been accomplished, the bonnet 28 may be separated from the valve and the carrier housing 46, being attached to the bonnet, will be separated from the valve body. The carrier housing will extract the annular sealing members 51 upon separation of the bonnet from the valve body and also will remove the seat members 64 and the gate member 54, since they are retained in assembly with the carrier housing. The valve body will be left as an empty shell with no movable internal parts and will be ready for immediate insertion of new valve parts.

Figure 3:
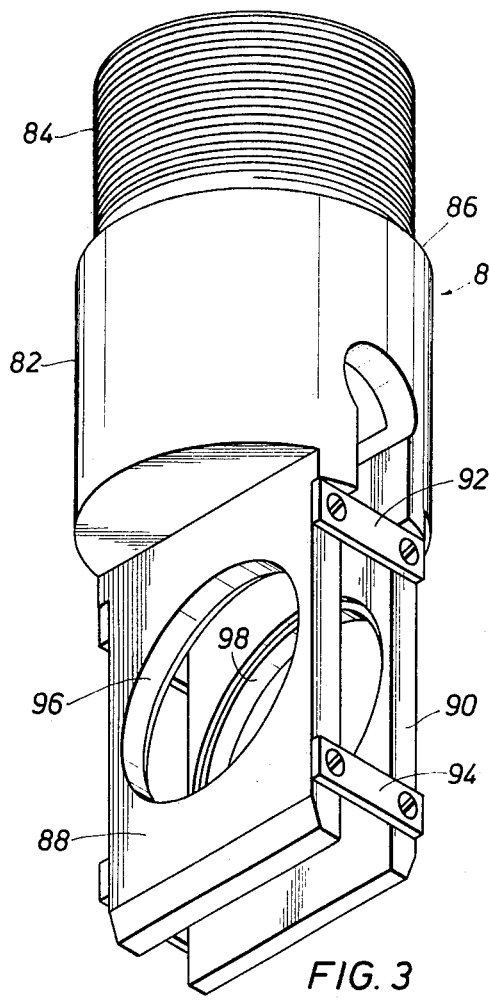
FIG. 3 is an isometric view of a modified seat and gate guide housing structure.
Figure 5:
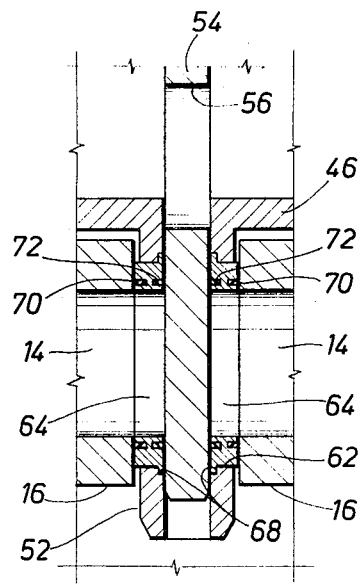
FIG. 5 is a fragmentary sectional view of the gate valve structure of FIG. 1 illustrating the relationship of the internal movable parts of the valve mechanism.

As illustrated in FIG. 3, a modified embodiment of my carrier housing structure is illustrated generally at 80 and includes an upper cylindrical portion 82, cooperating with an upper externally threaded portion 84 thereof in such manner as to define an annular shoulder 86 substantially as illustrated at 49 in FIG. 1. A pair of substantially parallel plate like seat carrier and gate guide members 88 and 90 are formed integrally with the cylindrical portion 82 of the carrier housing 80 and are maintained in parallel relationship by spacer plates 92 and 94 connected to the plates 88 and 90 by screws as shown, by welding or by any other desirable means. The spacer plates 92 and 94 also serve to guide the gate member 54 as the gate is inserted between the plates 88 and 90. The parallel plates 88 and 90 are also provided with apertures 96 and 98 which, when inserted into the valve body, will be disposed in registry with the inlet and outlet passageways of the valve. Annular seat members are retained within the apertures 96 and 98 essentially as shown in FIG. 5.

Figure 4:
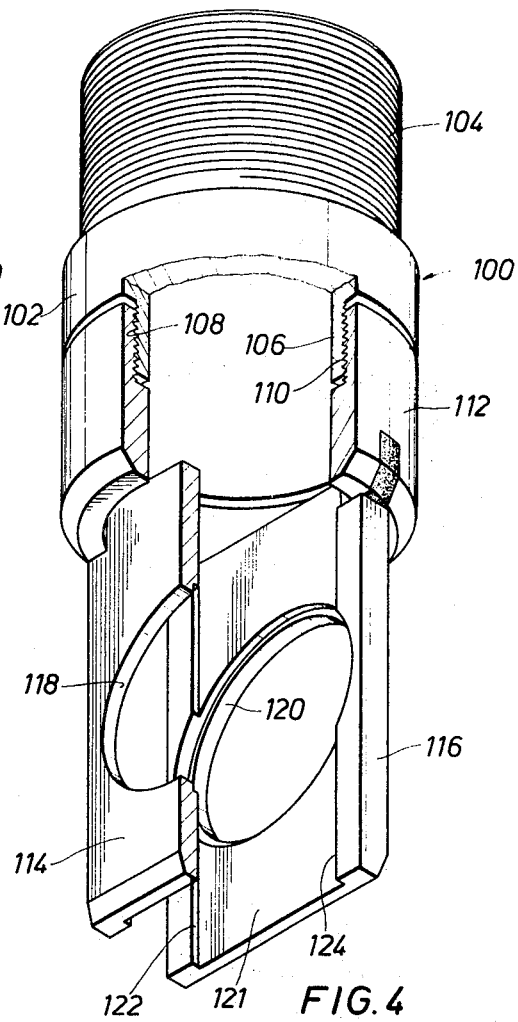
FIG. 4 is an isometric view of a further modified gate guide and seat carrier housing having parts thereof broken away and illustrated in section.

With reference now to FIG. 4, another modified embodiment is illustrated showing a carrier housing generally at 100, including an upper cylindrical portion 102 having a threaded upper extremity 104 of essentially the same configuration and for the same purpose as shown in FIG. 3. The upper portion 102 of the carrier housing includes a reduced diameter portion 106 defining the lower extremity thereof which is provided with external threads 108, disposed for threaded engagement with internal threads 110, formed within a lower portion 112 of the carrier housing. The lower portion 112 is provided with depending gate guide and seat carrier members 114 and 116 having seat carrier apertures 118 and 120 formed therein. The gate guide and seat carrier members may be formed integrally with the lower portion 112 of the carrier housing 100, but the preferred embodiment illustrated in FIG. 4 shows members 114 and 116 as being connected to the lower tubular portion 112 by welding or the like. The parallel support members 114 and 116 are provided with a depression 121 defining generally parallel gate guide flanges 122 and 124. The gate member of the valve is receivable within the depression 121 and is maintained against lateral misalignment by the parallel guide flanges 122 and 124.

Accurate linear and rotative adjustment of the carrier housing 100 is achieved by controlled adjustment of the upper threads 104 into the internally threaded bonnet and by precisely rotating the threaded connection between the portions 102 and 112 of the carrier housing. After the carrier housing 100 has been properly adjusted, the portions 102 and 104 may be locked together by means of pins not shown by welding or by any other desirable means.

While discussion of my invention has been limited to gate valve structure for the purpose of simplicity, it is to be understood that the invention may be utilized with equal success in combination with other valve structures, such as ball valves, cylindrical or tapered plug valves and the like, within the spirit and scope of the invention.

In view of the foregoing, it is clearly apparent that I have invented a new and novel valve structure which allows the gate, seats and other movable parts of the valve to be disassembled and removed from the valve body structure as a unit along with the bonnet member. In addition to accomplishing this feature, my invention also allows the utilization of floating or pressure actuated seat assemblies which are capable of moving to a limited degree in order to achieve proper sealing engagement with the working surface of the gate member and with the sealing surfaces of the valve body. The unique carrier housing structure of my invention also is capable of infinite adjustment in order to allow precise positioning of the seat members relative to the sealing surfaces of the valve. The invention also allows the gate member to be disposed in proper registry with the inlet and outlet passageways of the valve in the open position thereof. My invention effectively allows quick and easy removal and replacement of all of the working parts of the valve in a single operation, thereby promoting use of the invention under circumstances where repair is ordinarily difficult to accomplish. My invention allows the accomplishment of valve repair in subsea environments either through manual removal or replacement of the valve parts or through utilization of automatic remotely controlled removal and replacement equipment. My invention may be employed in both land based valve systems or valves systems located in submerged condition without departing from the spirit or scope thereof. My invention is, therefore, will suited to accomplish all of the objects hereinabove set forth, together with other objects and advantages which are inherent in the description of the apparatus itself.

I claim:

1. A valve having a valve body defining a valve chamber, inlet and outlet passageways formed in said valve body and intersecting said valve chamber, said valve body defining opposed sealing surfaces formed within said valve chamber about said inlet and outlet passageways, a connector flange formed at the upper extremity of said valve body and defining an opening into said valve chamber, a guide surface defined within said valve body, a valve bonnet having a bonnet flange formed thereon and disposed in sealed abutment with said connector flange to form a closure for said valve body, means securing said bonnet flange in sealed abutment with said connector flange, a valve stem carried within said bonnet and being movable relative to said bonnet, a carrier housing being fixed to said bonnet and extending into said valve chamber, said carrier housing engaging said guide surface to precisely orient said carrier housing within said valve body, opposed apertures formed in said carrier housing, seat means loosely carried within said apertures and being positioned in sealing engagement with said sealing surfaces, a valve element having a port being disposed within said carrier housing in sealing engagement with said seat means and being connected at the upper extremity thereof to said stem means, said valve element preventing said seat means from becoming disassembled from said carrier housing, said stem means moving said valve element between a closed position where said valve element effectively blocks the flow of fluid through said inlet and outlet passages and an open position where said port is disposed in registry with said inlet and outlet passages.

2. A valve as set forth in claim 1, a portion of said carrier housing having a substantially rectangular interior configuration, said valve element being a reciprocating gate and being disposed in close fitting relation with the side walls of said housing, said housing having guide surfaces cooperating with said gate to maintain lateral alignment between said port and said inlet and outlet passageways.

3. A valve as set forth in claim 1, said carrier housing having adjustment means for establishing proper linear and rotatable positioning of said carrier housing to achieve lateral and vertical alignment between the seat members and sealing surfaces.

4. A valve as set forth in claim 1, said means for retaining said connector flange and said bonnet flange in sealed assembly comprising a plurality of segment clamps retained in assembly with said bonnet, actuating means carried by said bonnet for actuating said segment clamps between latched and unlatched positions thereof.

5. A valve as set forth in claim 4, said carrier housing having a pair of generally parallel depending plate members, gate guide means on said plate members for preventing lateral misalignment of said gate member relative to said inlet and outlet passages.

6. A valve having a valve body defining a valve chamber, inlet and outlet passageways formed in said valve body and intersecting said valve chamber, opposed sealing surfaces formed within said valve body about said inlet and outlet passages, a bonnet forming a closure for said valve chamber, means securing said bonnet in sealed assembly with said valve body, a valve stem extending through said bonnet and being movable relative to said bonnet, means for inducing operative movement to said valve stem, a carrier housing depending in fixed relation from said bonnet and extending into said valve chamber, opposed apertures formed in said carrier housing, seat members loosely disposed in each of said apertures and being in sealing engagement with said sealing surfaces, said housing having adjustment means for establishing proper linear and rotatable positioning of said carrier housing to achieve lateral and vertical alignment of said seat members relative to said sealing surfaces, a valve element having a port therein being movably disposed within said carrier housing and being connected to said stem, said valve element sealingly engaging said seat members and cooperating with said seat members to prevent disassembly of said seat members from said carrier housing.

7. A valve as set forth in claim 6, each of said seat members having a stop flange engaging said housing to limit movement of the seat member in a direction away from said valve element.

8. A valve as set forth in claim 6, said carrier housing having a substantially rectangular interior configuration, said valve element being a reciprocating gate member and being disposed in close fitting relation with the side walls of said housing, said housing having guide surfaces cooperating with said gate to maintain lateral alignment between said port and said inlet and outlet passageway.

9. A valve as set forth in claim 6, said valve body having guide surface means formed therein, said carrier housing engaging said guide surface means to precisely position said carrier housing within said valve body.

10. A valve having a valve body defining a valve chamber, inlet and outlet passageways formed in said valve body and intersecting said valve chamber, said valve body defining opposed sealing surfaces formed within said valve chamber about said inlet and outlet passageways, a connector flange formed at the upper extremity of said valve body and defining an opening into said valve chamber, a valve bonnet having a bonnet flange formed thereon and disposed in sealed abutment with said connector flange to form a closure for said valve body, a valve operator mechanism connected to said bonnet, a valve stem extending through said bonnet and being movable by said valve operator, a plurality of segment clamps engaging said connector flange and said bonnet flange and maintaining said flanges in sealed abutting relationship, a shroud carried by said valve operator and being movable relative to said bonnet, said shroud engaging said segment clamps and pivoting the segment clamps between the latched and unlatched position thereof relative to said flanges, a carrier housing depending from said bonnet and extending into said valve body, seat carrier means defined on said carrier housing, seat means loosely supported by said seat carrier means and being disposed in sealing engagement with said sealing surfaces, a valve element disposed within said carrier housing and being operatively connected to said valve stem, said valve element preventing said seat members from becoming separated from said seat carrier means.

11. A valve comprising a valve body defining a valve chamber and having inlet and outlet passageways formed therein and disposed in intersecting relationship with said valve chamber, annular seat surfaces defined within said valve body about said inlet and outlet passageways, a bonnet forming a closure for said valve body, a valve stem extending through said bonnet and being movable relative thereto, a carrier housing depending in fixed relation from said bonnet and extending into said valve chamber, said carrier housing having opposed apertures formed therein, valve seat members loosely carried within said opposed apertures and being disposed in sealing engagement with said sealing surfaces, guide means defined within said carrier housing, a valve element movably disposed within said housing and being operatively connected to said valve stem, said valve element cooperating with said carrier housing and said seat members to retain said seat members in assembly with said carrier housing, said valve element being movable between open and closed positions thereof to control the flow of fluid through said inlet and outlet passageways, said housing being linearly and rotatably adjustable to insure precise vertical and lateral positioning of said seat members relative to said sealing surfaces.

* * * * *